United States Patent
Cho et al.

(10) Patent No.: US 9,304,670 B2
(45) Date of Patent: Apr. 5, 2016

(54) DISPLAY DEVICE AND METHOD OF CONTROLLING THE SAME

(71) Applicant: LG ELECTRONICS INC., Seoul (KR)

(72) Inventors: Eunhyung Cho, Seoul (KR); Sinae Chun, Seoul (KR); Doyoung Lee, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 14/163,658

(22) Filed: Jan. 24, 2014

(65) Prior Publication Data

US 2015/0160840 A1    Jun. 11, 2015

(30) Foreign Application Priority Data

Dec. 9, 2013   (KR) .................. 10-2013-0152110

(51) Int. Cl.
| | | |
|---|---|---|
| *G06T 11/00* | (2006.01) | |
| *G06T 11/60* | (2006.01) | |
| *G06T 11/20* | (2006.01) | |
| *G06F 3/048* | (2013.01) | |
| *G06F 3/0484* | (2013.01) | |
| *G06T 3/40* | (2006.01) | |
| *G06F 3/0488* | (2013.01) | |

(52) U.S. Cl.
CPC .......... *G06F 3/04845* (2013.01); *G06F 3/0488* (2013.01); *G06T 3/40* (2013.01); *G06T 11/001* (2013.01); *G06T 11/60* (2013.01); *G06T 2210/22* (2013.01)

(58) Field of Classification Search
CPC combination set(s) only.
See application file for complete search history.

(56) References Cited

U.S. PATENT DOCUMENTS

| | | |
|---|---|---|
| 2004/0177325 A1 | 9/2004 | Keane et al. |
| 2007/0291134 A1 | 12/2007 | Hwang et al. |
| 2011/0286040 A1 | 11/2011 | Seto et al. |
| 2012/0056876 A1* | 3/2012 | Lee et al. ............... 345/419 |
| 2013/0057934 A1 | 3/2013 | Satomi et al. |
| 2013/0135315 A1* | 5/2013 | Bares et al. ............. 345/473 |
| 2013/0321460 A1 | 12/2013 | Linburn et al. |
| 2015/0187163 A1* | 7/2015 | Brosnan et al. ........... 463/2 |

FOREIGN PATENT DOCUMENTS

| | | |
|---|---|---|
| KR | 10-2007-0120403 A | 12/2007 |
| WO | WO 2009/076279 A2 | 6/2009 |

* cited by examiner

*Primary Examiner* — Wesner Sajous
(74) *Attorney, Agent, or Firm* — Birch, Stewart, Kolasch & Birch, LLP (57) ABSTRACT

A display device includes a display unit configured to display an image; a sensor unit configured to sense an input to the display device and to generate an input signal according to a sensed result; and a processor, wherein the processor is further configured to: provide a user interface for editing the displayed image, divide the image into a first area and a second area if a first input signal is detected, determine any one of the first area and the second area as a variable area having variable visibility if a second input signal is detected, switch the variable area to an invisible state and display an indicator indicating the invisible state of the variable area if a third input signal is detected, and switch the variable area in the invisible state to a visible state if a fourth input signal is detected.

21 Claims, 12 Drawing Sheets

<Before editing image>

<After editing image>

DISPLAY DEVICE AND METHOD OF CONTROLLING THE SAME

This application claims the benefit of Korean Patent Application No. 10-2013-0152110, filed on Dec. 9, 2013, which is hereby incorporated by reference as if fully set forth herein.

BACKGROUND OF THE INVENTION

1. Field of the Invention

The present disclosure relates to a display device and a method controlling the same, and more particularly, to a display device for determining a variable area having variable visibility and changing a state of the determined variable area to edit an image.

2. Discussion of the Related Art

Recently, as an image editing technique has been developed, various devices for providing a user interface which may edit an image have been introduced.

A conventional device for providing an image editing function provides only a simple image editing function such as image cropping or size adjustment. In particular, the conventional device cannot provide editing functions such as image cropping and image folding. In addition, if the image has been edited, it is difficult for a third party to view an image editing state or an original image state.

SUMMARY OF THE INVENTION

Accordingly, the present disclosure is directed to a display device and a method of controlling the same that substantially obviate one or more problems due to limitations and disadvantages of the related art.

An object of the present disclosure is to provide a display device which can set at least a part of an image as a variable area having variable visibility.

Another object of the present disclosure is to provide a display device which can switch a variable area to a visible state or an invisible state.

Another object of the present disclosure is to provide a display device which can provide an indicator indicating a state of a variable area.

Another object of the present disclosure is to provide a security setting interface for setting security of a variable area and a security clearance interface for clearing security of a variable area.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display unit configured to display an image; a sensor unit configured to sense an input to the display device and to generate an input signal according to a sensed result; and a processor configured to control the display unit and the sensor unit, wherein the processor is further configured to: provide a user interface for editing the displayed image, divide the image into a first area and a second area if a first input signal is detected, determine any one of the first area and the second area as a variable area having variable visibility if a second input signal is detected, switch the variable area to an invisible state and display an indicator indicating the invisible state of the variable area if a third input signal is detected, and switch the variable area in the invisible state to a visible state if a fourth input signal is detected.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

Although the terms used in the present disclosure are selected from generally known and used terms, terms used herein may be variable depending on operator's intention or customs in the art, appearance of a new technology, or the like. In addition, some of the terms mentioned in the description of the present disclosure have been selected by the applicant at his or her discretion, the detailed meanings of which are described in relevant parts of the description herein. Furthermore, the present disclosure must be understood, not simply by the actual terms used but by the meanings of each term lying within.

Although embodiments are described in detail with reference to the accompanying drawings, the present disclosure is not limited by the embodiments.

Figure 1:
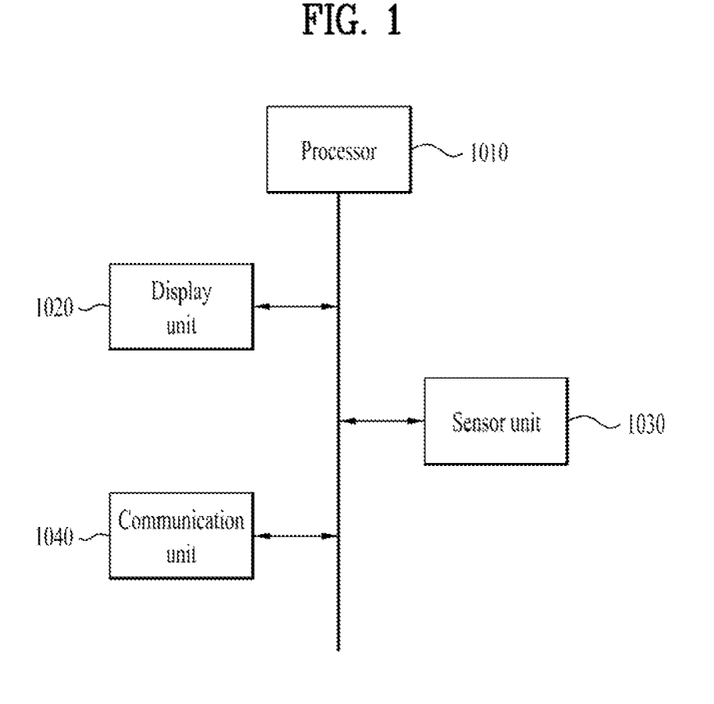
FIG. 1 is a block diagram showing a display device according to one embodiment.

FIG. 1 is a block diagram of a display device according to one embodiment. FIG. 1 shows one embodiment, from which some components may be deleted or to which new components may be added as necessary. Hereinafter, for convenience of description, the display device is referred to as a "device".

In the present disclosure, the device according to one embodiment may include a processor 1010, a display unit 1020, a sensor unit 1030 and a communication unit 1040.

The display unit 1020 may display an image. Here, the image indicates visual information recognized by user's eyes and may include a photo, a drawing, text, a moving image, a user interface, an application execution screen, etc. In particular, the present disclosure relates to a device for providing a user interface for editing an image and the display unit 1020 may display the user interface. Further, the display unit 1020 may display an original image before editing, an image which is being edited and/or an edited image. The display unit 1020 may sequentially display the above-described images to display an image editing process to the user. Further, the display unit may display an indicator indicating an image editing state. A detailed description of image editing will be described in greater detailed below.

The sensor unit 1030 may sense a variety of input for the device. More particularly, the sensor unit 1030 may sense input to the device using at least one sensor mounted in the device and generate an input signal according to the sensed result. Further, the sensor unit 1030 may deliver the generated input signal to the processor 1010. Here, the at least one sensor may include a gravity sensor, a geomagnetic sensor, a motion sensor, a gyroscopic sensor, an acceleration sensor, an infrared sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, a touch sensor, a grip sensor, etc. The above-described sensors may be separately included in the device. In addition, the above-described sensors may be combined into at least one element and included in the device.

The communication unit 1040 may perform communication with an external device using various protocols. The device may transmit and receive a variety of signals and data to and from an external device via the communication unit 1040. In particular, in the present disclosure, the device may transmit and receive data of an edited image to/from the external device via the communication unit 1040.

The processor 1010 may control the units of the device and control data transmission/reception between the units. In addition, the processor 1010 may process data of the device to execute various applications.

In addition, the processor 1010 may receive the input signal from the sensor unit 1030 to detect the input signal. The processor 1010 may operate according to a command corresponding to the input signal if the input signal is detected. In particular, if the processor 1010 detects the input signal, various functions related to image editing may be performed. A detailed description thereof will be described below with reference to FIGS. 3*a* to 4.

Although not shown in FIG. 1, the device may include a storage unit, an audio input/output unit and/or a power unit according to embodiments.

The storage unit (not shown) may store a variety of digital data such as images, audio, video, moving images, etc. The storage unit may indicate a variety of digital data storage spaces such as a flash memory, a random access memory (RAM) or a solid state drive (SSD). In particular, in the present disclosure, the storage unit may temporarily or continuously store an edited image via a user interface. Alternatively, the storage unit may temporarily or continuously store data received from an external device via the communication unit 1040.

The audio output unit (not shown) includes audio output means such as a speaker or an earphone. In addition, the audio output unit may output audio based on a control command of the processor 1010 or an application executed by the processor 1010.

The power unit (not shown) is a power source connected to a battery of the device or an external power supply and may supply power to the device.

Hereinafter, if steps or operations are performed by the device by sensing user input, a process of generating and delivering a signal according to the sensed user input will not be repeatedly described. In addition, it may be expressed that the processor 1010 controls the device or at least one unit included in the device according to input. The processor 1010 may be equated with the device.

The device shown in FIG. 1 is exemplary and blocks shown in FIG. 1 correspond to logically divided elements of the device. Accordingly, the elements of the device may be mounted in one chip or a plurality of chips according to device design.

Figure 2:
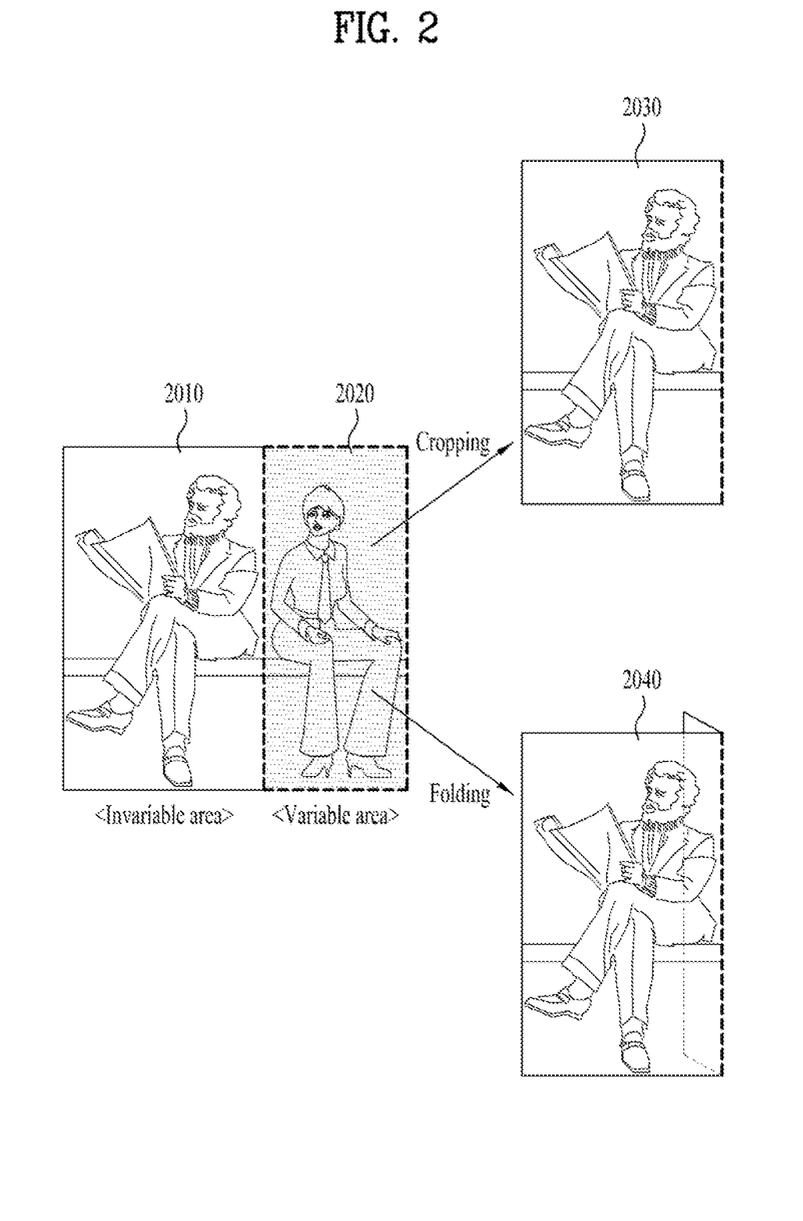
FIG. 2 is a diagram showing a display device for editing an image according to one embodiment.

FIG. 2 is a diagram showing a display device for editing an image according to one embodiment.

The device may provide a user interface for editing an image. In particular, the device of the present disclosure may provide a user interface for editing an image such that the user experiences the sensation of doing paper craft using paper. For example, a user may fold or crop an image in a desired shape via the user interface. Accordingly, the user may directly edit an image and store the edited image in the device or transmit the edited image to a counterpart device. Therefore, the user may take an interest in editing image.

In order to provide such a user interface, the device may divide an image into a variable area 2020 and an invariable area 2010. Here, the variable area 2020 may indicate an area having variable visibility and the invariable area 2010 may indicate an area having continuous visibility. More particularly, the variable area 2020 may be controlled to or not to have visibility according to a detected input signal and the invariable area 2010 may indicate an area having continuous visibility regardless of the detected input signal.

Here, the variable area 2020 may include a visible state and an invisible state. More specifically, the variable area 2020 may be switched to the visible state or the invisible state according to the detected input signal. Here, the visible state indicates a state in which the variable area 2020 may be recognized through user's eyes and the invisible state indicates a state in which the variable area 2020 may not be recognized through user's eyes or may be barely recognized through user's eyes. The device may detect the input signal of the variable area 2020 and switch the variable area 2020 to the visible state or the invisible state according to the detected input signal, thereby editing the image. A detailed description of the device for editing the image according to the detected input signal will be described in detail below with reference to FIGS. 3*a* to 4.

The invisible state of the variable area 2020 may indicate a continuously invisible state 2030 or a temporarily invisible state 2040. The continuously invisible state 2030 may indicate that the image of the variable area 2020 may not be "continuously" recognized through user's eyes or may be barely "continuously" recognized through user's eyes. In other words, the continuously invisible state 2030 may indicate a state in which image data corresponding to the variable area 2020 has been deleted. For example, the continuously invisible state 2030 may indicate a state in which the image of the variable area 2020 has been cropped.

The temporarily invisible state 2040 may indicate a state in which the image of the variable area 2020 may not be "temporarily" recognized through user's eyes or may be barely "temporarily" recognized through user's eyes. In other words, the temporarily invisible state 2040 may indicate a state in which attributes of the image of the variable area 2020 have been changed or image data corresponding to the variable area 2020 has been modified. For example, the temporarily invisible state 2040 may indicate a state in which the variable area 2020 is folded. Change in attributes of the variable area 2020 may indicate that the invisible state of the variable area 2020 is different from the visible state thereof in terms of at least one of brightness and darkness, luminance, color, transparency and contrast. In the "temporarily" invisible state, if an additional input signal for the variable area 2020 is detected, the device may switch from the temporarily invisible state 2040 to the visible state, unlike the continuously invisible state 2030. A detailed description thereof will be given in detail below with reference to FIG. 3*b*.

The invisible state may be determined as the continuously invisible state 2030 or the temporarily invisible state 2040 according to a user selection input signal for selecting attributes of the invisible state, device design, design purpose, design method, manufacturing method of a manufacturer, executed application type or settings.

Figure 3A:
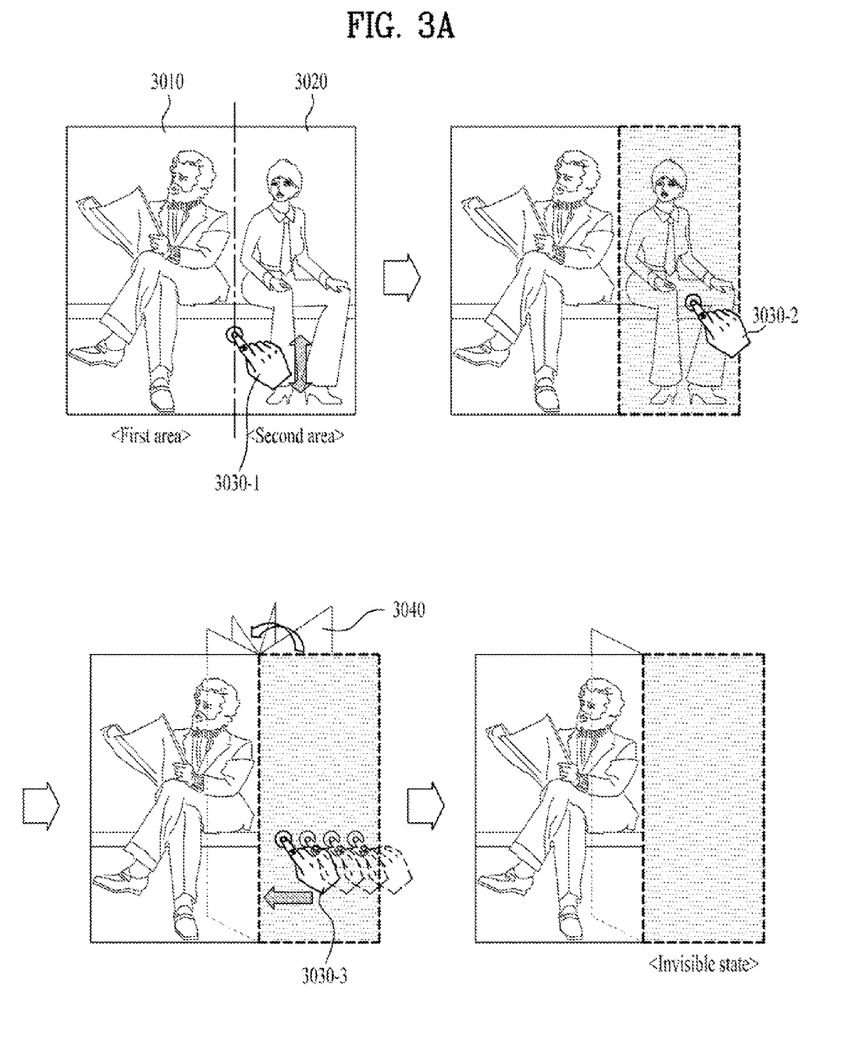
FIG. 3a is a diagram showing one embodiment of a display device for switching an image of a variable area to an invisible state according to a detected input signal.
Figure 3B:
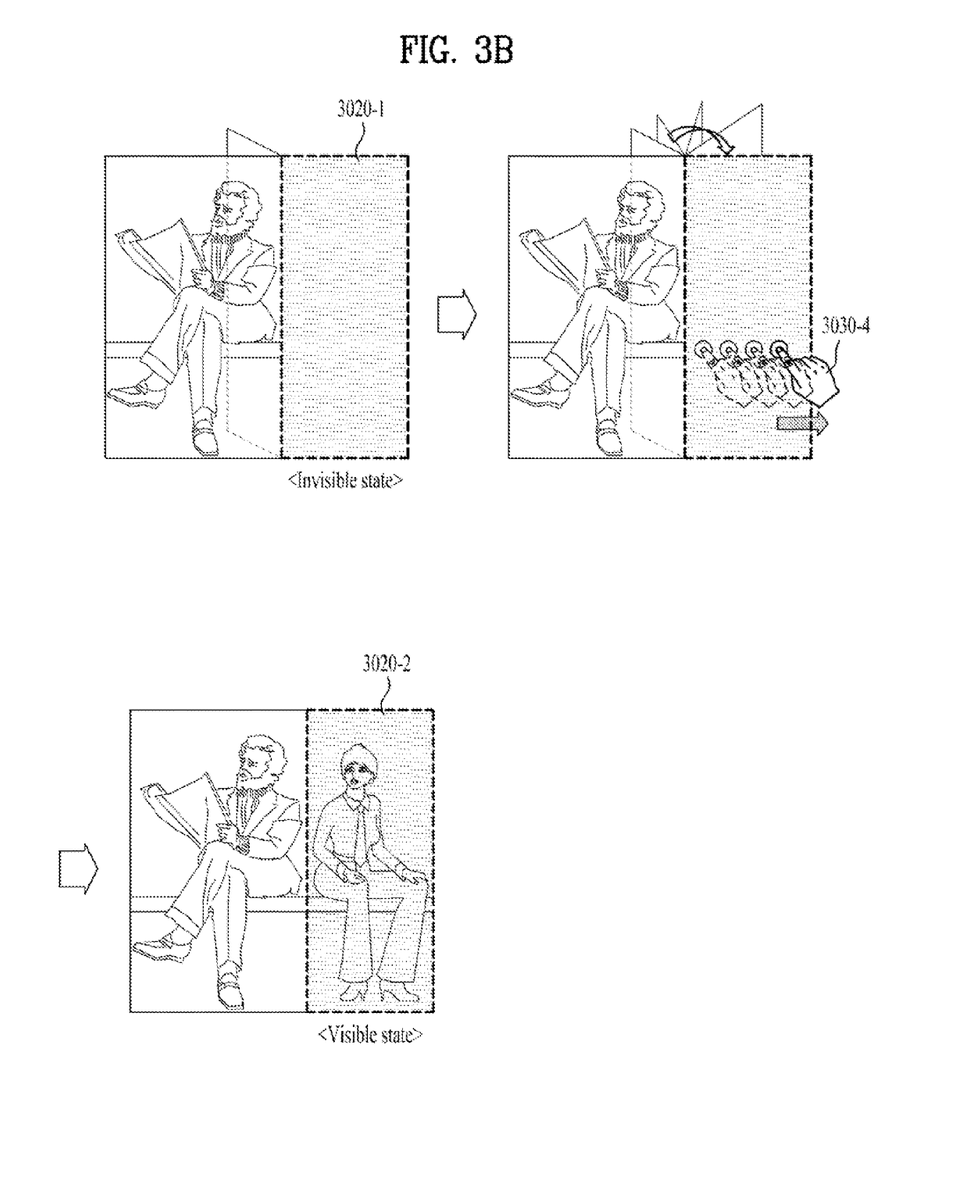
FIG. 3b is a diagram showing one embodiment of a display device for switching an image of a variable area, which has been switched to an invisible state, to a visible state according to a detected input signal.

FIG. 3 is a diagram showing one embodiment of a display device for editing an image according to a detected input signal. More particularly, FIG. 3*a* is a diagram showing one embodiment of a display device for switching an image of a variable area to an invisible state according to a detected input signal. FIG. 3*b* is a diagram showing one embodiment of a display device for switching an image of a variable area, which has been switched to an invisible state, to a visible state according to a detected input signal. The display device may operate in order of FIGS. 3*a* and 3*b*.

The device of FIG. 3*a* may edit the image according to the detected input signal. First, the device may detect a first input signal. If the first input signal is detected, the device may divide the image into a first area 3010 and a second area 3020. The first input signal may indicate a variety of input signals for dividing the first area 3010 and the second area 3020. In this figure, the device for detecting a drag input signal 3030-1 indicating a borderline between the first area 3010 and the second area 3020 as the first input signal is shown. The device may determine the first area 3010 and the second area 3020 according to the detected first input signal. The borderline between the first area 3010 and the second area 3020 may be displayed as an indicator.

Next, the device may detect a second input signal. If the second input signal is detected, the device may determine one of the first area 3010 and the second area 3020 as the variable area having variable visibility according to the second input signal. The second input signal may include various input signals for selecting the variable area. In this figure, the device for detecting short-press touch input 3030-2 for the second area 3020 as the second input signal is shown. If the variable area is determined according to the second input signal, the device may change the attributes of the variable area in order to indicate the variable area. For example, the device may change the color of the selected area according to the second input signal to indicate the variable area.

Although not shown in this figure, the second input signal may be detected as the same input signal as the first input signal. In other words, the device may detect the first input signal and the second input signal as the same input signal, divide the image into the first area 3010 and the second area 3020, and determine one of the two areas as the variable area. For example, if the user sets the borderline for determining the second area 3020 of the displayed image, the device may determine the area divided by the borderline as the second area 3020 and determine the second area 3020 as the variable area.

Next, the device may detect a third input signal. If the third input signal is detected, the device may switch the state of the variable area 3020. More specifically, if the third input signal is detected, the device may switch the variable area 3020 determined according to the second input signal to the invisible state. The invisible state indicates a state in which the variable area 3020 may not be recognized through user's eyes or may be barely recognized through user's eyes. A detailed description thereof was described above with reference to FIG. 2. The third input signal may include various input signals for the device and is not limited to that shown in the figure. In one embodiment, the third input signal may be an input signal detected in succession to the second input signal. This figure shows the device for detecting a first drag input signal 3030-3 for the variable area 3020 as the third input signal. More specifically, this figure shows the device for detecting the first drag input signal 30303-3 for dragging the variable area 3020 toward the invariable area 3010 as the third input signal.

In the present embodiment, if the invisible state is a temporarily invisible state, the device may provide graphic effects 3040 for displaying a process of switching to the temporarily invisible state. For example, as shown, the device may provide graphic effects 3040 such as folding the image of the variable area 3020 in a drag input direction in correspondence with drag input. Through such graphic effects 3040, the user may experience the sensation of physically folding the image.

If the state of the variable area 3020 is switched, the device may provide an indicator indicating the state of the variable area 3020 and a detailed description thereof will be described below with reference to FIGS. 5*a* and 5*b*.

The device of FIG. 3*b* may switch the state of the variable area 3020 according to the detected input signal. More specifically, if a fourth input signal for the variable area 3020 in the invisible state 3020-1 is detected, the device may switch the invisible state 3020-1 of the variable area 3020 to the visible state 3020-2. The fourth input signal may include various input signals for the device. More specifically, the fourth input signal may include various input signal for the variable area 3020 and/or the indicator. The indicator indicates the state of the variable area 3020, which will be described in detail below with reference to FIGS. 5*a* and 5*b*. In this figure, the device for detecting a second drag input signal 3030-4 for the variable area 3020 as the fourth input signal is shown. More specifically, this figure shows the device for detecting the second drag input signal 3030-4 for dragging the variable area 3020 from the invariable area 3010 to the variable area 3020 as the fourth input signal. Accordingly a dragging direction of the second drag input signal 3030-4 is substantially an opposite direction of a dragging direction of the first drag input signal 3030-3.

If the invisible state 3020-1 is a temporarily invisible state, the device may switch the temporarily invisible state 3020-1 to the visible state 3020-2 according to the detected fourth input signal. This is because the variable area is in the "temporary" invisible state. However, if the invisible state 3020-1 is in a continuously invisible state, even when the fourth input signal is detected, the device may not switch from the continuously invisible state to the visible state 3020-2. This is because, if the image is edited and stored, image data corresponding to the continuously invisible state has already been deleted and stored. However, if the image is not yet edited and stored, the continuously invisible state may also be switched to the visible state 3020-2 according to the fourth input signal. In this case, the fourth input signal may be an original image view input signal, a returning input signal or an execution cancellation input signal for returning to the visible state 3020-2 before being switched to the continuously invisible state.

As described above with reference to FIG. 3a, the device of the present embodiment may also provide graphic effects for displaying the process of switching the invisible state 3020-1 to the visible state 3020-2. For example, as shown, the device may provide graphic effects for unfolding the image of the variable area 3020 in the drag input direction in correspondence with drag input. Through such graphic effects, the user may experience the sensation of physically unfolding the image.

Figure 4:
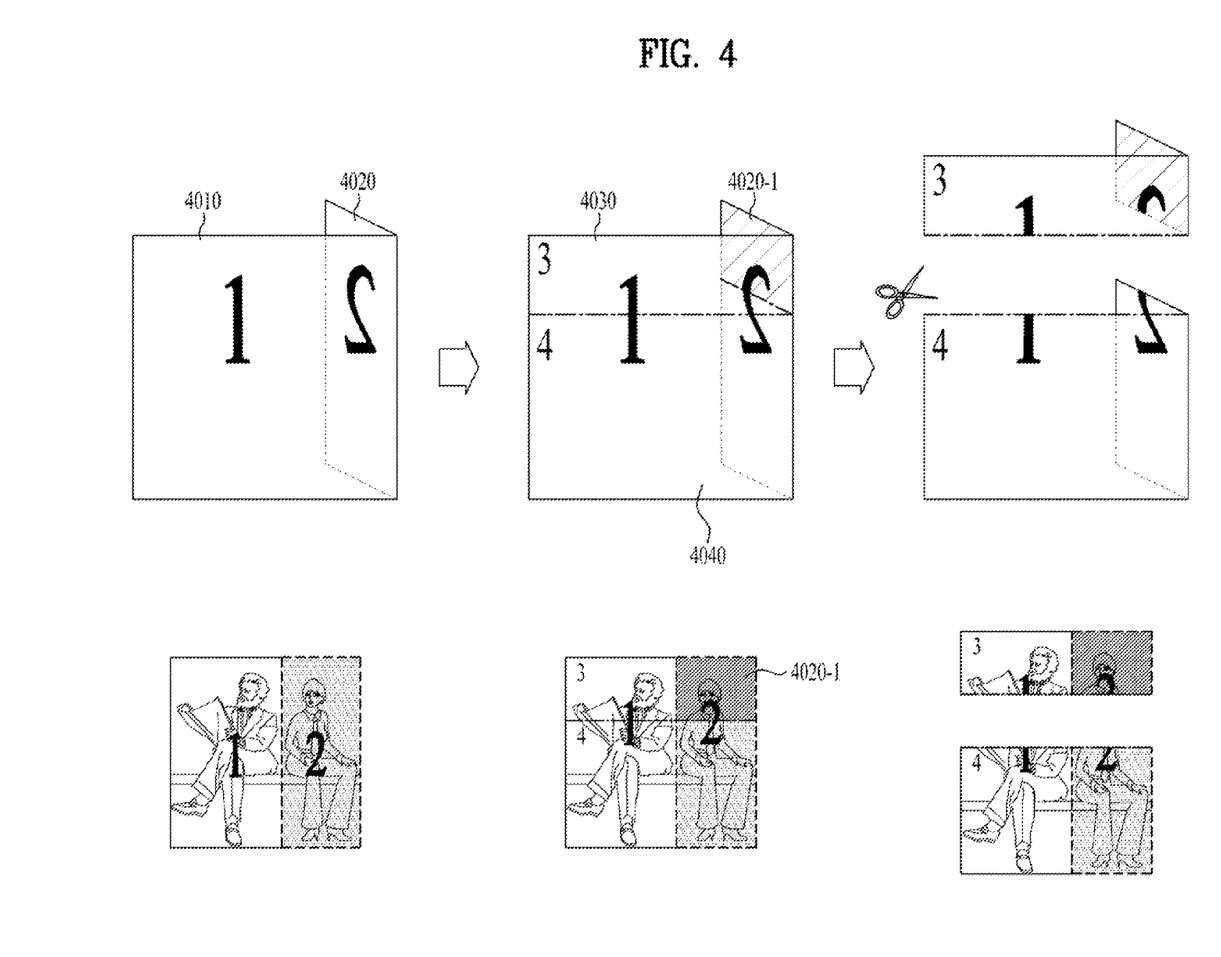
FIG. 4 is a diagram showing one embodiment of a display device for editing an image according to a detected input signal.

FIG. 4 is a diagram showing one embodiment of a display device for editing an image according to a detected input signal. More specifically, this figure shows an embodiment of the case in which the image is edited in order of the temporarily invisible state and the continuously invisible state.

First, the device may detect a first input signal. If the first input signal is detected, the device may divide the image into a first area 4010 and a second area 4020. At this time, the first input signal may indicate various input signals for dividing the first area 4010 and the second area 4020.

Next, the device may detect a second input signal. If the second input signal is detected, the device may switch the second area 4020 to the temporarily invisible state. At this time, the second input signal may indicate various input signals for the second area 4020. If the second area 4020 is switched to the temporarily invisible state, the device may display an indicator indicating that the second area 4020 is switched to the temporarily invisible state. For example, as shown, the image of the second area 4020, which is horizontally reversed, overlaps the image of the first area 4010 such that the user feels as if the second area 4020 is folded from the first area 4010. Various embodiments of the indicator will be described below with reference to FIGS. 5a and 5b.

Next, the device may detect a third input signal. If the third input signal is detected, the device may divide the image into a third area 4030 and a fourth area 4040. At this time, the third input signal includes various input signals for dividing the third area 4030 and the fourth area 4040 and may be equal to or similar to the first input signal. At this time, the third area 4030 may include at least a part 4020-1 of the second area 4020 switched to the temporarily invisible state. Accordingly, the third area 4030 may include the second area 4020 or the part 4020-1 of the second area 4020 switched to the temporarily invisible state. Hereinafter, for convenience of description, at least the part 4020-1 of the second area 4020 included in the third area 4030 is referred to as a common area. The common area 4020-1 may be determined based on a borderline for dividing the third area 4030 and the fourth area 4040.

Next, the device may detect a fourth input signal. If the fourth input signal is detected, the device may switch the third area 4030 to the continuously invisible state. As the third area 4030 is switched to the continuously invisible state, the common area 4020-2 included in the third area 4030 may also be switched to the continuously invisible state. As if paper is folded and cut, effects such as cropping at least a part of a folded area may be obtained. Therefore, the user may feel as if the user directly folds or crops the image.

Additionally, the device may detect a fifth input signal. If the fifth input signal is detected, the device may switch the second area 4020 excluding the common area 4020-1 of the fourth area 4040 to the visible state. This is because the second area 4020 excluding the common area 4020-1 is in a temporarily invisible state. At this time, the fifth input signal may include various input signals for the variable area and/or the indicator.

Figure 5A:
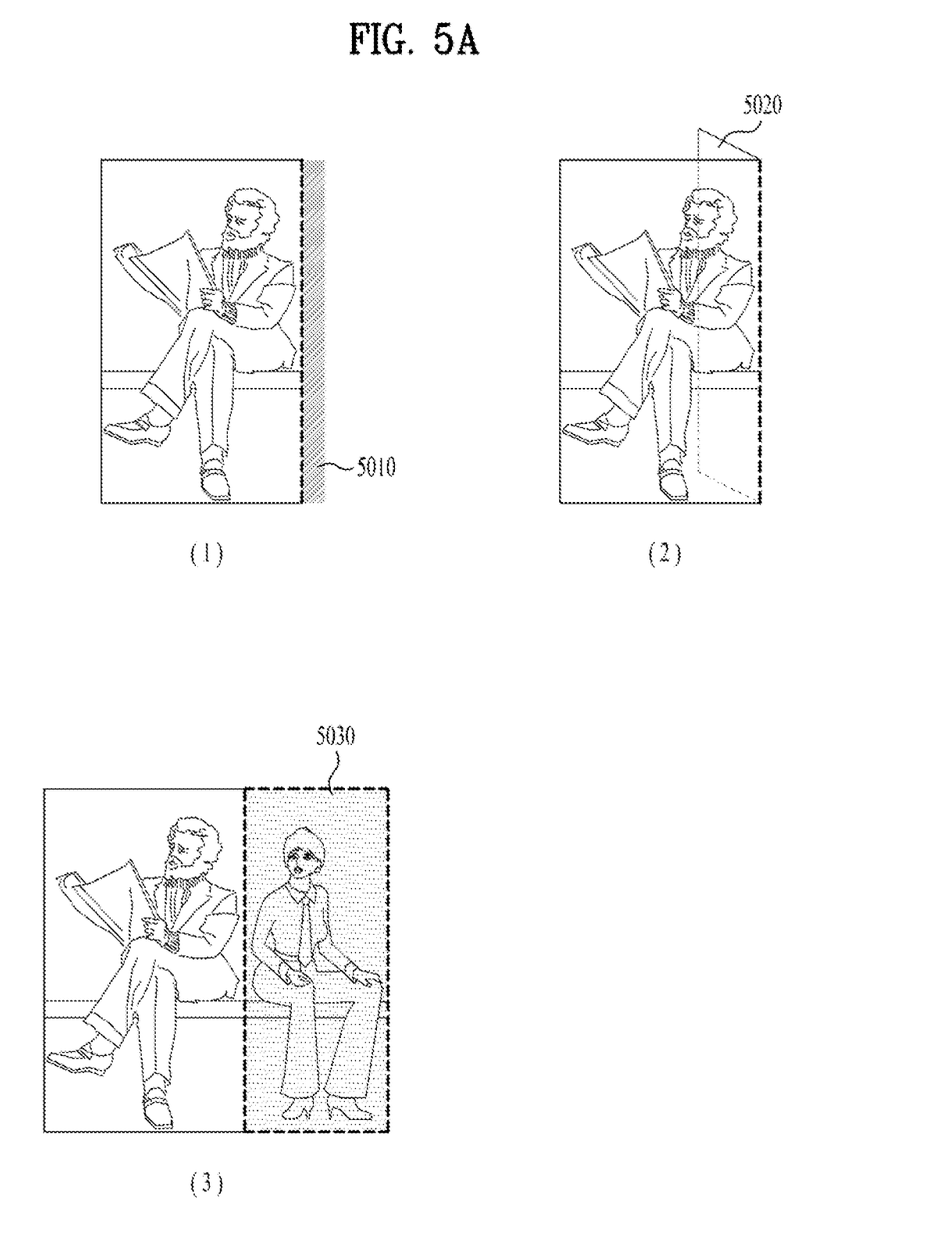
FIGS. 5a and 5b are diagrams showing a display device for providing an indicator indicating an invisible state according to one embodiment.
Figure 5B:
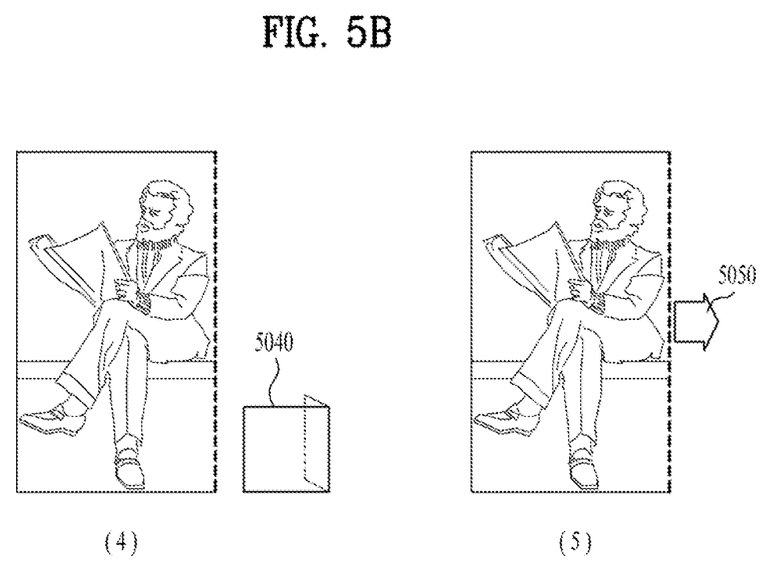

FIGS. 5a and 5b are diagrams showing a display device for providing an indicator indicating an invisible state according to one embodiment.

Since the temporarily invisible state may be switched to the visible state, it is necessary to indicate the state of the variable area such that the user enters an input signal for switching the states. Accordingly, the device may provide the indicator indicating the invisible state as various embodiments.

In one embodiment, as shown in FIG. 5a-(1), the device may display an indicator 5010 based on the borderline between the variable area and the invariable area. The indicator 5010 may be displayed as various images.

In another embodiment, as shown in FIG. 5a-(2), the device may display the indicator 5020 overlapping forward or backward in order to enable the user to feel as if the user folds paper backward. At this time, the indicator 5020 may be a contour line image of the variable area. Alternatively, the indicator 5020 may be an image of the variable area which is horizontally or vertically reversed. This is because, if paper is folded, a folded area appears as being horizontally or vertically reversed. Accordingly, the device may display the reversed variable image overlapping the invariable area to provide effects such as paper folding. Therefore, the user may experience the sensation of physically folding the image.

In another embodiment, as shown in FIG. 5a-(3), the device may provide an indicator 5030 by differently setting the attributes of the variable area and the invariable area. Here, the attributes may indicate brightness and darkness, luminance, color, transparency and contrast. The device may differently set the attributes of the variable area and the invariable area as the variable area is switched to the temporarily invisible state. For example, the device may darken the variable area as compared to the invariable area so as to indicate the temporarily invisible state of the variable area to the user.

In another embodiment, as shown in FIG. 5b-(4), the device may display the indicator 5040 indicating the temporarily invisible state separately from the edited image. More specifically, the device may separately display the shape of the image of the variable area, which is switched to the temporarily invisible state, as the indicator 5040.

In another embodiment, as shown in FIG. 5b-(5), the device may display a directional image as an indicator 5050. Through the directional image, the user may recognize that the image may be unfolded in a direction indicated by the indicator 5050.

In addition, there are various embodiments of the indicator and the disclosure is not limited to the above-described embodiments.

The device may provide the indicator to inform the user of presence of the variable area in the temporarily invisible state. In addition, the device may detect an input signal for the variable area or the displayed indicator so as to switch the variable area in the temporarily invisible state to the visible state. For example, if the device detects touch input for the displayed indicator, the variable area may be switched to the visible state.

Although not shown, an indicator indicating the continuously invisible state may also be provided. In one embodiment, the device may provide graphic effects such as paper cutout in the borderline between the variable area and the invariable area to provide the indicator. Therefore, the user may recognize that the variable area is switched to the continuously invisible state. In addition, the embodiments of the indicator indicating the temporarily invisible state are equally applicable to the indicator indicating the continuously invisible state.

Figure 6:
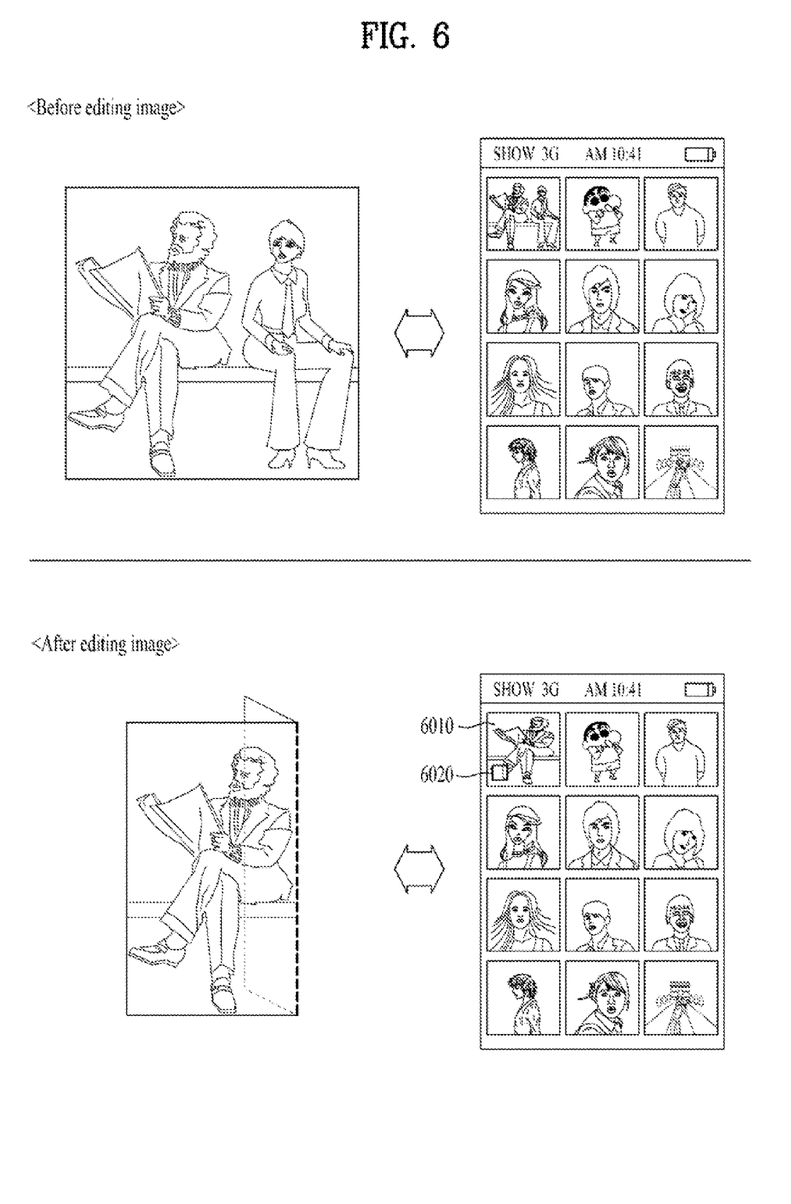
FIG. 6 is a diagram showing a display device for providing a thumbnail of an edited image according to one embodiment.

FIG. 6 is a diagram showing a display device for providing a thumbnail of an edited image according to one embodiment.

If the image is edited and stored, the device may provide a thumbnail 6010 having the state of the edited image. More specifically, the device may provide the thumbnail 6010 having the state of the variable area if the thumbnail 6010 of the edited image is provided.

For example, if the variable area is switched to the invisible state, the device may provide the thumbnail 6010 of the image excluding the variable area. In other words, if the variable area is switched to the invisible state, the device may provide the thumbnail 6010 of the image of the invariable area. The user may receive a preview of the edited image via the thumbnail 6010 having the state of the variable area.

The indicator 6020 described with reference to FIGS. 5a and 5b may be added and provided as the thumbnail 6010. The user may easily recognize the edited state of the image through the thumbnail 6010.

Figure 7:
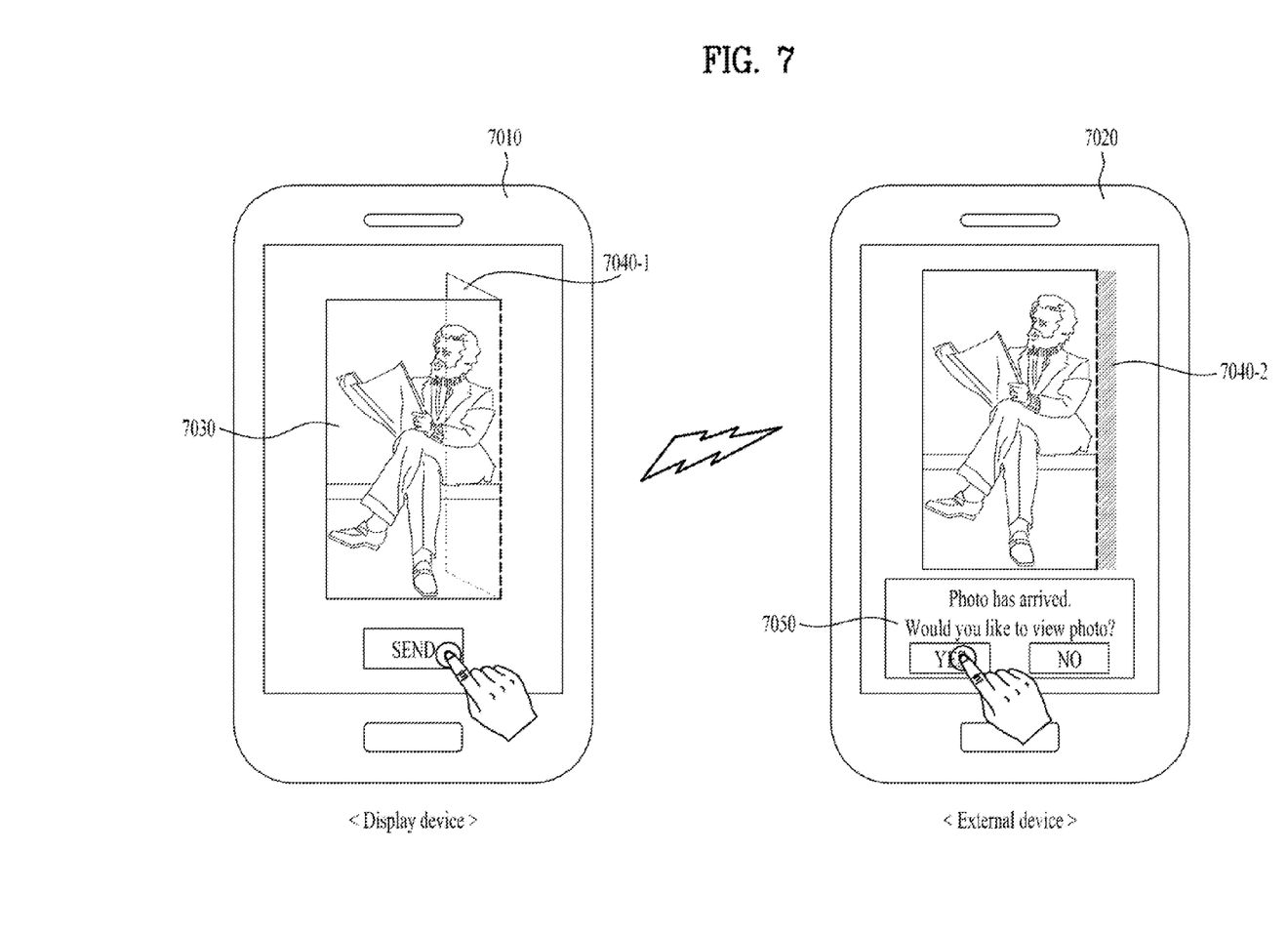
FIG. 7 is a diagram showing a display device for transmitting an edited image to an external device according to one embodiment.

FIG. 7 is a diagram showing a display device for transmitting an edited image to an external device according to one embodiment.

The device 7010 may transmit the edited image to the external device 7020. In other words, the device 7010 may transmit the edited image to the external device 7020 using the communication unit. In this case, the device 7010 may transmit data including state information of the variable area to the external device 7020. For example, if the variable area is in the continuously invisible state, the device 7010 may transmit, to the external device 7020, only data regarding the image corresponding to the invariable area 7020 except for data regarding the image corresponding to the variable area. Alternatively, the variable area is in the temporarily invisible state, the device 7010 may transmit data including modification information of the image corresponding to the variable area to the external device 7020.

The external device 7020, which has received the image data, may provide the edited image according to the acquired data. More specifically, the external device 7020 may provide the image having the state of the variable area according to the image information and the state information of the variable area included in the acquired data.

The image data may also include not only the state information of the variable area but also information about the indicator 7040-1. If the device 7010 transmits the image data including the information about the indicator 7040-1, the external device 7020, which has received the data, may provide the same indicator 7040-1 as the transmission device 7010. However, if the indicator shape of the external device 7020 is set to be different from that of the transmission device 7010, the external device 7020 may provide the indicator 7040-2 having another shape. That is, the same indicator 7040-1 or different indicator 7040-2 may be provided according to the settings of the indicators 7040-1 and 7040-2 of the devices 7010 and 7020.

The external device 7020 may detect a state switching input signal for the variable area so as to switch the state of the variable area to the visible state. At this time, the external device 7020 may provide a user interface 7050 for detecting the state switching signal of the variable area. The user may perform input for the user interface 7050 so as to switch the state of the variable area to the visible state. The embodiments of the input signal for switching the state of the variable area was described above with reference to FIGS. 3b and 4.

Figure 8:
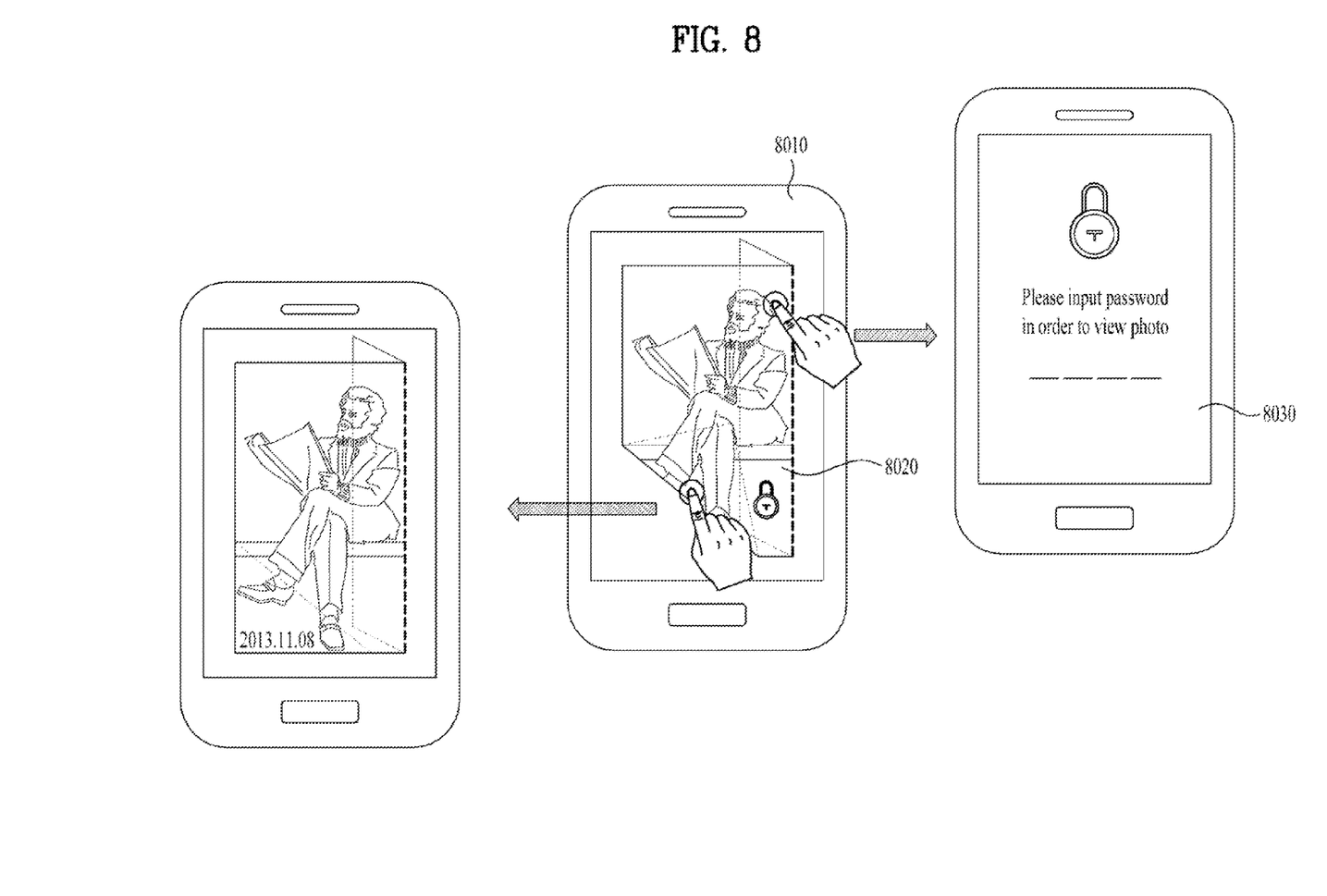
FIG. 8 is a diagram showing a display device for providing a security interface if a state of a variable area is switched according to one embodiment.

FIG. 8 is a diagram showing a display device for providing a security interface if a state of a variable area is switched according to one embodiment.

The device 8010 may provide a security setting interface (not shown) for setting the variable area as a security area 8020 if the variable area is switched to the invisible state. More specifically, if an input single for switching the variable area to the invisible state is detected, the device 8010 may provide a security setting interface. The security setting interface may indicate a user interface for setting the variable area as the security area 8020 in order to restrict free access to the variable area switched to the invisible state. The device 8010 may receive security information such as a password, a lock pattern, a fingerprint or an iris using the security setting interface. The user may enter the security information via such an input interface and set the variable area in the invisible state as the security area 8020.

The device 8010 may provide a security clearance interface 8030 for clearing security of the variable area if the variable area set as the security area 8020 is switched to the visible state. More specifically, if an input signal for switching the variable area set as the security area 8020 from the invisible state to the visible state 8030 is detected, the device 8010 may provide the security clearance interface 8030. The security clearance interface 8030 may indicate a user interface provided to clear security of the variable area set as the security area 8020. The device 8010 may receive security information via the security clearance interface 8030, determine whether the received information matches predetermined security information, and clear security of the variable area.

The user may set a specific area of an image as the security area 8020 using such a security interface and allow a specific user to access the security area 8020.

Figure 9:
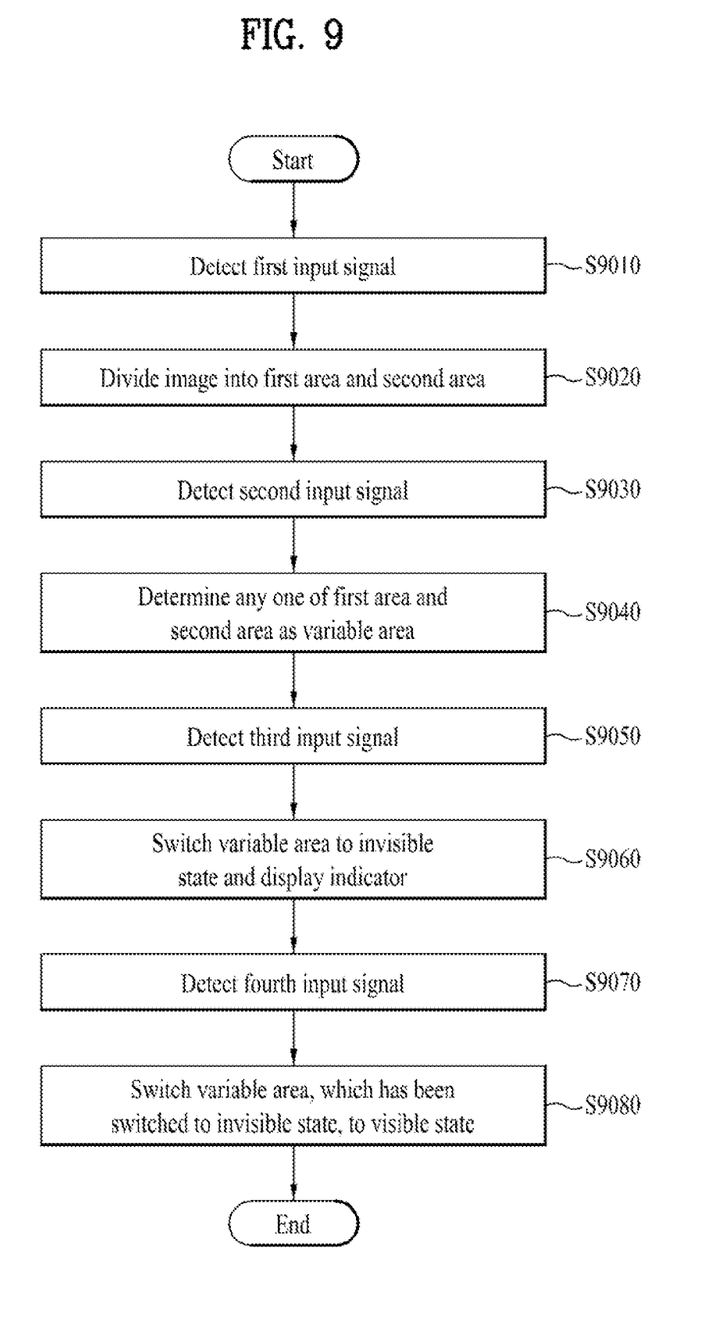
FIG. 9 is a flowchart illustrating a method of controlling a display device according to one embodiment.

FIG. 9 is a flowchart illustrating a method of controlling a display device according to one embodiment. In the flowchart, a detailed description of the parts similar or equal to those of FIGS. 1 to 8 will be omitted.

First, the device may detect the first input signal (S9010). The first input signal may indicate various input signals for the device and was described in detail with reference to FIG. 3.

Next, the device may divide the image into the first area and the second area (S9020). More specifically, the image may be divided into the first area and the second area according to the first input signal detected in the previous step. At this time, the device may display the borderline for dividing the first area and the second area as the indicator and was described in detail with reference to FIG. 3a.

Next, the device may detect a second input signal (S9030). The second input signal may indicate various input signals for the device and was described in detail with reference to FIG. 3a.

Next, the device may determine one of the first area and the second area as the variable area (S9040). More specifically, one of the first area and the second area may be determined as the variable area according to the second input signal detected in the previous step. Here, the variable area indicates an area having variable visibility. The variable area may be switched to the visible state or the invisible state and was described in detail with reference to FIG. 3a.

Next, the device may detect the third input signal (S9050). The third input signal may indicate various input signals for the device and was described in detail with reference to FIG. 3a.

Next, the device may switch the variable area to the invisible state and display the indicator indicating the invisible state (S9060). More specifically, the variable area may be switched to the invisible state according to the third input signal detected in the previous step and the indicator may be displayed. Here, the invisible state may indicate the temporarily invisible state or the continuously invisible state and was described in detail with reference to FIG. 3a. The indicator may indicate the invisible state of the variable area and was described in detail with reference to FIGS. 5a and 5b.

Next, the device may detect the fourth input signal (S9070). The fourth input signal may indicate various input signals for the device and was described in detail with reference to FIG. 3b.

Next, the device may switch the variable area, which has been switched to the invisible state, to the visible state (S9080). If the invisible state is a temporarily invisible state, the device may switch the temporarily invisible state to the visible state according to the detected fourth input signal. However, if the invisible state is a continuously invisible state, the device may perform switching to the visible state depending upon whether the image has been edited and was described in detail with reference to FIG. 4.

Figure 10:
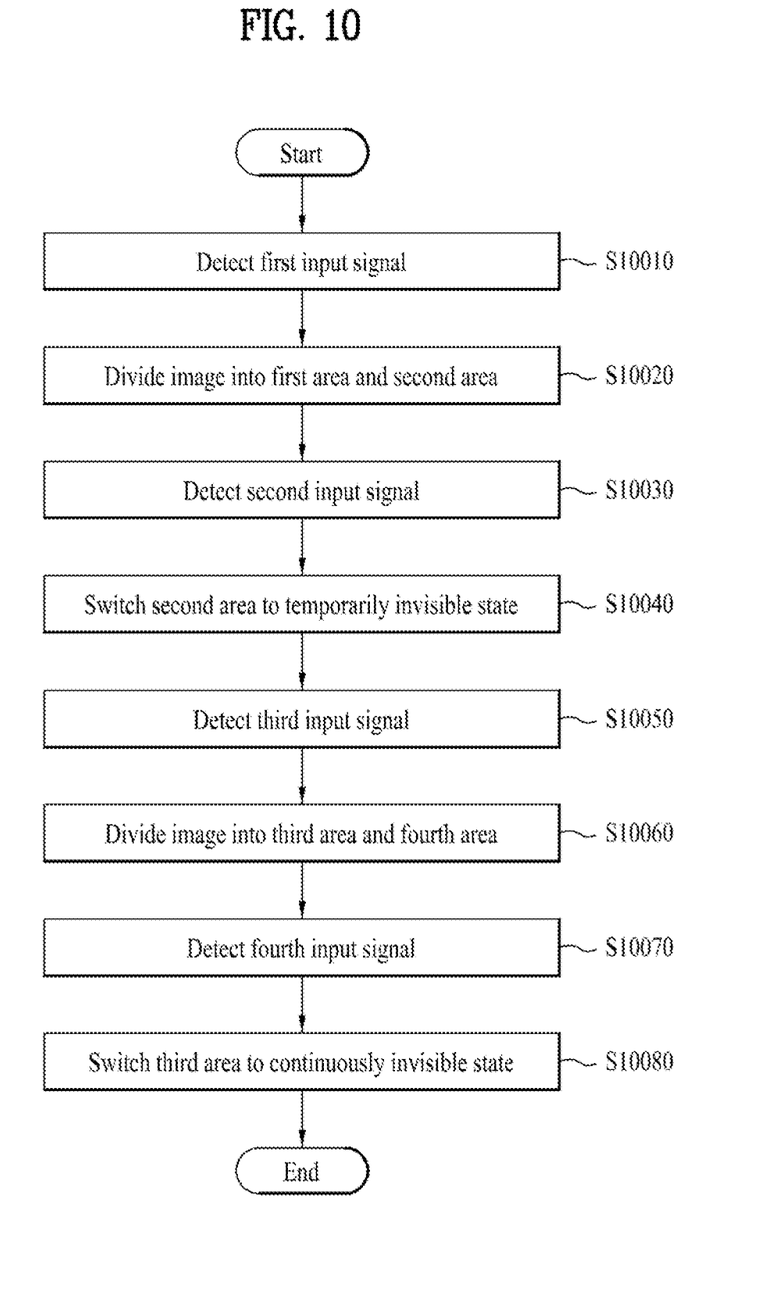
FIG. 10 is a flowchart illustrating a method of controlling a display device according to one embodiment.

FIG. 10 is a flowchart illustrating a method of controlling a display device according to one embodiment. In the flowchart, a detailed description of the parts similar or equal to those of FIGS. 1 to 9 will be omitted.

First, the device may detect the first input signal (S10010).

Next, the device may divide the image into the first area and the second area (S10020). More specifically, the device may divide the image into the first area and the second area according to the first input signal detected in the previous step.

Next, the device may detect the second input signal (S10030).

Next, the device may switch the second area to the temporarily invisible state (S10040). Here, the temporarily invisible state may indicate a state in which the variable area may not be recognized through user's eyes or may be barely recognized via user's eyes and was described in detail with reference to FIG. 2.

Next, the device may detect the third input signal (S10050).

Next, the device may divide the image into the third area and the fourth area (S10060). The third input signal may be equal or similar to the first input signal. In addition, the third area may indicate an area including at least a part of the second area switched to the temporarily invisible state.

Next, the device may detect the fourth input signal (S10070).

Next, the device may switch the third area to the continuously invisible state (S10080). The continuously invisible state may indicate a state in which the image of the variable area may not be "continuously" recognized through user's eyes or may be barely "continuously" recognized through user's eyes and was described in detail with reference to FIG. 4.

Although not shown, the device may further detect a fifth input signal. If the fifth input signal is detected, the device may switch the second area excluding the common area of the third area to the invisible state.

Further, although the embodiments are respectively described with reference to the respective drawings for convenience of description, the embodiments may be combined to implement a new embodiment. A computer readable recording medium having a program recorded therein for implementing the above-described embodiments is also within the spirit of the present disclosure.

The display device and the method of controlling the same according to one embodiment are not limited to the configurations and methods of the above-described embodiments and all or some of the embodiments may be combined and modified.

The display device and the method of controlling the same according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

According to one embodiment, a display device may divide an image into two areas according to a detected input signal and determine any one of the two areas as a variable area. Therefore, a user can easily set an image area to be edited.

According to another embodiment, a display device may provide an indicator indicating a state of a variable area such that a user easily recognizes the state of the variable area.

According to another embodiment, a display device may provide a security setting/clearance interface so as to selectively provide an image of a variable area to a specific user.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Both apparatus and method inventions are mentioned in this disclosure and descriptions of both the apparatus invention and method inventions may be complementarily applied to each other.

What is claimed is:

1. A display device comprising:
a display unit configured to display an image;
a sensor unit configured to sense a touch input to the display device and to generate a touch input according to a sensed result; and
a processor configured to control the display unit and the sensor unit,
wherein the processor is further configured to:
provide a user interface for editing the displayed image,
divide the image into a first area and a second area if a first touch input is detected,
determine any one of the first area and the second area as a variable area having variable visibility if a second touch input is detected,
switch the variable area to an invisible state and display an indicator indicating the invisible state of the variable area if a third touch input is detected, and
switch the variable area in the invisible state to a visible state if a fourth touch input is detected.

2. The display device according to claim 1, wherein the processor is further configured to:
detect the first touch input and the second touch input as a same touch input, and divide the image into the first area and the second area and determine any one of the first area and the second area as the variable area at the same time.

3. The display device according to claim 1, wherein the third touch input is detected in succession to the second touch input.

4. The display device according to claim 1, wherein the invisible state is a state in which the variable area is folded or cropped.

5. The display device according to claim 1, wherein the invisible state is different from the visible state in terms of at least one of brightness and darkness, luminance, color, transparency, size and contrast.

6. The display device according to claim 1, wherein the processor is further configured to display the indicator based on a borderline between the first area and the second area when the indicator is displayed.

7. The display device according to claim 1, wherein the third touch input and the fourth touch input are drag input signals for the variable area.

8. The display device according to claim 7, wherein the third touch input is detected if a first drag input signal in a first direction is detected and the fourth touch input is detected if a second drag input signal in a second direction is detected, and
wherein the first direction is a direction from the variable area to the invariable area and the second direction is substantially an opposite direction of the first direction.

9. The display device according to claim 1, wherein the fourth touch input is a touch input for the displayed indicator.

10. The display device according to claim 1, wherein the processor is further configured to provide a security setting interface for setting the variable area as a security area if the variable area is switched to the invisible state according to the third touch input.

11. The display device according to claim 10, wherein, if the variable area is set as the security area via the security setting interface, the processor is further configured to provide a security clearance interface for clearing security of the variable area if the fourth touch input is detected.

12. The display device according to claim 1, wherein, if a thumbnail of the edited image is provided, the processor is further configured to provide the thumbnail reflecting the state of the variable area.

13. The display device according to claim 1, further comprising a communication unit configured to transmit and receive data to and from an external device,
wherein, if image data of the edited image is transmitted, the processor is further configured to transmit the image data including state information of the variable area.

14. A display device comprising:
a display unit configured to display an image;
a sensor unit configured to sense input to the display device and to generate an input signal according to a sensed result; and
a processor configured to control the display unit and the sensor unit,
wherein the processor is further configured to:
provide a user interface for editing the displayed image,
divide the image into a first area and a second area if a first input signal is detected,
switch the second area of the image to a temporarily invisible state if a second input signal is detected,
divide the image into a third area and a fourth area if a third input signal is detected, wherein the third area includes at least a part of the second area in the temporarily invisible state, and
switch the third area to a continuously invisible state if a fourth input signal is detected.

15. The display device according to claim 14, wherein the temporarily invisible state is a folded state and the continuously invisible state is a cropped state.

16. The display device according to claim 14, wherein the at least a part of the second area included in the third area is determined based on a borderline for dividing the third area and the fourth area.

17. The display device according to claim 14, wherein, if the second area is switched to the temporarily invisible state, the processor is further configured to display a temporarily invisible indicator indicating the temporarily invisible state of the second area based on a borderline between the first area and the second area.

18. The display device according to claim 14, wherein, if the third area is switched to the continuously invisible state, the processor is further configured to display a continuously invisible indicator indicating the continuously invisible state of the third area based on the borderline between the third area and the fourth area.

19. The display device according to claim 14, wherein, if a fifth input signal is detected after the third area is switched to the continuously invisible state, the processor is further configured to switch the second area excluding the at least the part of the second area to the visible state.

20. A method of controlling a display device for providing a user interface for editing an image, the method comprising:
dividing the image into a first area and a second area if a first touch input is detected;
determining any one of the first area and the second area as a variable area having variable visibility if a second touch input is detected;
switching the variable area to an invisible state and displaying an indicator indicating the invisible state of the variable area if a third touch input is detected; and
switching the variable area, which has been switched to the invisible state, to a visible state if a fourth touch input is detected.

21. A method of controlling a display device for providing a user interface for editing an image, the method comprising:
dividing the image into a first area and a second area if a first input signal is detected;
switching the second area of the image to a temporarily invisible state if a second input signal is detected;
dividing the image into a third area and a fourth area if a third input signal is detected,
wherein the third area includes at least a part of the second area in the temporarily invisible state; and
switching the third area to a continuously invisible state if a fourth input signal is detected.

* * * * *